US007552698B2

(12) United States Patent
Xiang et al.

(10) Patent No.: US 7,552,698 B2
(45) Date of Patent: Jun. 30, 2009

(54) TRIPLOID BREEDING METHODS FOR DIFFERENT SHRIMP SPECIES

(75) Inventors: Jianhai Xiang, Shandong (CN); Fuhua Li, Shandong (CN); Linghua Zhou, Shandong (CN); Xiaojun Zhang, Shandong (CN)

(73) Assignee: Institute of Oceanology Chinese Academy of Sciences, Shandong (CN)

( * ) Notice: Subject to any disclaimer, the term of this patent is extended or adjusted under 35 U.S.C. 154(b) by 0 days.

(21) Appl. No.: 11/665,805

(22) PCT Filed: Nov. 29, 2004

(86) PCT No.: PCT/CN2004/001365

§ 371 (c)(1),
(2), (4) Date: Apr. 19, 2007

(87) PCT Pub. No.: WO2006/042445

PCT Pub. Date: Apr. 27, 2006

(65) Prior Publication Data

US 2008/0115734 A1 May 22, 2008

(30) Foreign Application Priority Data

Oct. 22, 2004 (CN) ................. 2004 1 0050654

(51) Int. Cl.
*A01K 61/00* (2006.01)
(52) U.S. Cl. ...................................................... 119/205
(58) Field of Classification Search ................. 119/205, 119/217
See application file for complete search history.

(56) References Cited

U.S. PATENT DOCUMENTS 4,489,674 A * 12/1984 Wolters et al. .............. 119/217
4,697,546 A * 10/1987 Chrisman et al. ........... 119/217
4,834,024 A * 5/1989 Allen et al. ................. 119/236
5,824,841 A * 10/1998 Guo et al. ...................... 800/8
7,013,836 B1 * 3/2006 Lynn ........................... 119/236
2005/0149997 A1 * 7/2005 Wolozin et al. ............... 800/13

FOREIGN PATENT DOCUMENTS

CN 1177437 A 4/1998

OTHER PUBLICATIONS

Dai Jixun et al., "Studies on the Triploid Induction in Penaeus orientalis I. Temperature Shocks", Herditas, vol. 15, No. 5, Sep. 1993, pp. 15-18.
Li Fuhua et al., "Optimization of triploid induction by heat shock in Chinese shrimp Fenneropenaeus chinensis", Aquaculture, vol. 219, Nos. 1-4, Apr. 2, 2003, pp. 211-231.
Li Fuhua et al., "Triploid Induction with Heat Shocks to Penaeus chinensis and Their Effects on Gonad Development", Chin. J. Oceanol. Limnol., vol. 17, No. 1, Jan. 1999, pp. 57-61.
S. Dumas et al., "Triploidy Induction in the Pacific White Shrimp Litopenaeus vannamei", Aquaculture Research, vol. 30, No. 8, Aug. 1999, pp. 621-624.

* cited by examiner

*Primary Examiner*—Yvonne R. Abbott
(74) *Attorney, Agent, or Firm*—Smith, Gambrell & Russell, LLP

(57) ABSTRACT

This invention is about triploid breeding method for different shrimp species especially to the triploid production both in cold-warm water shrimp and tropical species, including the induction of MI triploid shrimp, the triploid induction methods for different shrimp and the development and utilization of revulsants for triploid shrimp. The triploid of cold-water shrimps were obtained by collecting the fertilized eggs and heat shock treatment; while the triploid induction of tropical shrimps were obtained with collection of the fertilized eggs, treatment of the revulsants or cold shock. The advantages of the invention are as follows: it has determined the optimal-inducing processes and methods for different species of shrimps, and led to the inducing rate increased distinctly; It also has determined the optimal-inducing methods for MI triploid shrimp, and led to the inducing rate increased distinctly without the destroy of eggs; The revulsants which led to high inducing efficiency in this invention are nontoxic, so the operation security and the safety to environment are improved.

14 Claims, No Drawings

US 7,552,698 B2

TRIPLOID BREEDING METHODS FOR DIFFERENT SHRIMP SPECIES

TECHNIQUE FIELD

This invention relates to the methods for triploid breeding of different shrimp especially to the triploid induction for both cold-warm water shrimp and tropical species. This invention belongs to the aquaculture techniques. Triploid shrimp of different species with high triploidy rate can be produced by this technique.

BACKGROUND OF THE INVENTION

Shrimp culture plays an important role in aquaculture of China. In recent years, problems such as degenerating germplasm, decreasing seedling quality and severe diseases, have embarrassed healthy development of the shrimp culture. So it is necessary to improve shrimp germplasm by biological techniques with accelerated growth or enhanced stress resistance in marine aquaculture. Genetic improvement has been implied well in several aquaculture animals such as fish and shellfish at cellular and chromosome levels by using biological techniques. It can increase aquaculture yields and improve quality by using sterility of triploids on one hand. These triploids can also be taken as carriers for transgenic techniques of aquatic organisms. Utilization of triploids can solve the safety problem associated with transgenic animals to avoid wild germplasm contamination coming from escape of transgenic animals. So the triploid induction technique is expected to solve or relieve the increasing problems in shrimp culture. In November 2003, scientists emphasized that combining transgenic technique and triploid is one of the most efficient methods to relieve environment hazards brought by transgenic animals at the consultative meeting about transgenic animals' security held in Rome by Food and Agriculture Organization of the United Nations.

Due to the special characteristics of reproduction of shrimp, successful cases of triploid shrimp induction in batches was reported only in Chinese shrimp recently (see Li, F. H., Xiang, J. H., Zhou, L. H., Wu, C. G., Zhang, X. J., 2003. Optimization of triploid induction by heat shock in Chinese shrimp *Fenneropenaeus chinensis*. Aquaculture 219: 221-231), which has accomplished in the inventors' laboratory. However, there is no report on successful induction in tropical shrimp such as *Penaeus merguiensis* and *Metapenaeus ensis*.

SUMMARY OF THE INVENTION

The optimal inducing methods for triploids were selected for different shrimp species depending on the differences of ecological habits and reproduction characteristics of different shrimp species. Inducing methods for MI triploids were also determined by improved experiment procedure in this invention. Further more, considering about the feasibility of the techniques at large scale and the safety to the environment, new reagent for polyploid shrimp induction were developed. These techniques provide basis for shrimp improvement.

In order to realize the above destination, the technical program of this invention is as follows:

Detailed procedures of a method for triploid production of different shrimp species for cold-warm water shrimp, meiosis I (MI) triploids obtained by heat shock are as follows:

1) Collection of the fertilized eggs: The spawning temperature of the gravid shrimps were controlled at 15-16° C. After spawning, the shrimps were removed from containers. These containers with spawned eggs were left to settle down to let the fertilized eggs sink naturally, and then the surplus water in the container was removed to concentrate the fertilized eggs.

2) Heat shock treatment: The treatment starts at 8-12 min after spawning process. The seawater temperature in the container with fertilized eggs was adjusted to 30-31° C. for 8-10 min. MI triploid shrimps were successfully produced at this situation.

At 15-20 min after the spawning of cold-warm water shrimp, surplus water was filtered with the sieve cloth to concentrate the fertilized eggs; the sieve cloth containing these fertilized eggs was immerged in seawater and ready for the next treatment. At 30-34 min after spawning, the sieve cloth together with the fertilized eggs was removed to immerge in 0.5-0.6% (w/v) PC solution for 15-18 min. The treated fertilized eggs in the sieve cloth were then transferred to a hatching tank for shrimp hatching. The ploidy of the treated batch was detected by a flow cytometry.

The above mentioned cold-warm water shrimp mainly relate to Chinese shrimp *Fenneropenaeus chinensis*.

Detailed procedures of a method for triploid breeding of different shrimp species for triploid production of tropical shrimp are as follows:

1) Collection of the fertilized eggs: The spawning temperatures of the gravid shrimps were controlled at 27-28° C. After spawning, the shrimps were removed from the containers. These containers with spawned eggs were left to settle down to let the fertilized eggs sink naturally, and then surplus water was removed from the containers to obtain the fertilized eggs.

2) The collected fertilized eggs were filtered by the sieve cloth, and then put into the seawater solution containing 200-400 μM 6-DMAP with duration of 10-12 min at 10-15 min after the shrimp spawning. The triploid of tropical shrimps were successfully produced by this treatment.

The above procedure 2) can be changed as follows: the collected fertilized eggs were filtered by the sieve cloth, then immerged into the seawater at 5-10° C. with duration of 15-20 min at 10-15 min after the shrimp spawning. The release of the polar bodies in fertilized eggs of the tropical shrimp was inhibited by cold shock. The triploid tropical shrimps were successfully produced by this treatment.

The mentioned tropical shrimp refers to *Penaeus merguiensis* or *Metapenaeus ensis*.

1. Chinese shrimp *Fenneropenaeus chinensis* is a coldwater shrimp species. The gravid shrimps spawn at 14-20° C. in reproduction seasons, so heat shock can be efficient for their triploid induction. It was proved that the heat shock treatment was a high efficient approach to induce triploid Chineses shrimp. In order to widen the time window for chromosome manipulation to inhibit the release of the first polar body, the spawn temperature of gravid shrimp is controlled at 15-16° C. The shrimp fertilized eggs are easy to break at early stage increasing difficulty for handling to inhibit the first polar body release, thus decreasing stir to the fertilized eggs as possible can protect eggs integrity. After the fertilized eggs have settled down naturally, surplus water is removed out to concentrate eggs, and then the seawater temperature is adjusted to inhibit the first polar body release by heat shock. These procedures above are not available by other inducing methods such as chemical treatment or hydrostatic pressure treatment, in which the seawater volume is difficult to determine so the concentration of inducing solution is unclear. By methods including hydrostatic pressure treatment, strict requirement is necessary for the volume of treated eggs and it is also impossible not stirring the eggs.

2. In tropical shrimp such as *Penaeus merguiensis* or *Metapenaeus ensis*, a higher temperature is required to efficiently induce triploid if heat shock treatment was used. In this case, even triploids can be induced, the hatching rate of treated eggs is very low. So it is difficult to be applied in triploid production. 6-DMAP can induce tropical triploid in these two species efficiently with concentration of 200-400 µM, the starting time depends on spawn temperature and microscope observation, and the duration time for treatment depends on the inducing concentration. In addition, one of the optimal-inducing methods for tropical triploid production is to inhibit the polar body release by cold shock. It is recommended to select proper inducing methods in particular experiment under particular situation.

3. The traditional chemical inducing method for triploid is to inhibit the polar body release by cytochalasins B. In early 1990s, 6-DMAP was successfully used for triploid induction in shellfish. Compared to CB, 6-DMAP is lower in toxicity, cheaper in price and simple for handling. However, the toxicity and security of both CB and 6-DMAP have to be considered in practical application, so new nontoxic revulsants will play an important role in industrialization of triploid shrimp. The revulsant PC for triploid shrimp, selected in this invention, is a common chemical reagent, which is nontoxic, flavourless, cheap in price and simple for handling. With efficiently inhibiting the polar body release of the fertilized eggs, this revulsant has a good application prospect.

The invention has following advantages:

1. In this invention, the optimal inducing approaches and method was developed for different shrimp culture species including cold-water shrimp and tropical shrimp. Different triploid shrimp could be produced conveniently and efficiently and the triploidy level was highly improved. Aimed to the difficulty of MI triploid induction, a practical technique design was proposed, and the efficiency of MI triploid induction is raised remarkedly without destroying the quality of the fertilized eggs.

2. The revulsant PC developed in this invention was applied in shrimp triploid breeding for the first time. The inducing rate is very high which can reach more than 90%. Furthermore, the operation security and the safety to environment are improved. The revulsant PC which is nontoxic, cheap in price, simple for handling, safe to environment and able to be produced in China, has a very good application prospect.

3. This invention not only has solved an international difficult problem in triploid induction, but also can obtain nearly 100% triploid shrimp larvaes in batch, which laid solid foundation for triploid industrialization of different shrimp species.

DESCRIPTION OF THE INVENTION IN DETAIL

EXAMPLE 1

MI Triploid Production in Chinese Shrimp *Fennneropenaeus chinensis*

The fertilized eggs of shrimp at early stage is fragile, it is difficult to manipulate. In this invention, a set of methods to induce MI triploids in Chinese shrimp have been developed to overcome the shortcoming of fragility of eggs and produced high level of triploid shrimp. The detailed procedures are shown as follows:

1. Gravid shrimps were obtained from wild populations in the sea area in April 2003. They were brought into the aquarium of the Institute of Oceanology, Chinese Academy of Sciences. The shrimps were reared to be acclimated to the laboratory environment with controlled temperature at 15° C. Gravid shrimps were fed with polychaeta and fresh clam meat in order to promote the maturation of ovary.

2. To facilitate the manipulation, gravid shrimps that would spawn immediately were put into 20 L containers with seawater. At the meantime, the light cycle was controlled in order to make the shrimps spawn under the dark environment (by cover the containers with black cloth) at daytime to make it conveniently manipulate. After the shrimps had spawned, they were removed from the containers. These containers with spawned eggs were left to settle down, and then surplus water was removed out.

3. The treatment started at 8-12 min after the shrimps spawning process (combining with microscope observation, before the release of the first polar body) with duration of 8-10 min when the temperature of the seawater which containing the fertilized eggs was adjusted rapidly to 30-31° C. MI triploid of Chinese shrimps were successfully produced by this treatment. The level of triploid induction reached more than 70%, with the highest of 100%. Furthermore, the hatched triploid nauplius have developed to adult shrimps.

EXAMPLE 2

The Triploid Induction with 6-DMAP in *Penaeus merguiensis* and *Metapenaeus ensis*

The spawning temperatures of gravid shrimps were controlled at 27-28° C. The fertilized eggs were collected according to the methods in example 1 and filtered by the sieve cloth, then they were put into the seawater solution containing 300 µM 6-DMAP with duration of 10 min at 10-15 min after spawning process (combining with microscope observation, after the release of the first polar body). The level of triploid induction reached to as high as 80% in *P. merguiensis* and 83% in *M. ensis*.

EXAMPLE 3

The Triploid Induction by Cold Shock in *P. merguiensis*

The spawning temperature of gravid shrimps were controlled at 27-28° C. The fertilized eggs were collected according to the methods in example 1 and filtered by the sieve cloth, then they were immerged into the seawater at 5-10° C. with duration of 15-20 min after 10-15 min of the spawning process (depending on the microscope observation, before the release of the first polar body). The highest level of triploid induction reached 85% in *P. merguiensis*. This method was also available in the triploid induction in *M. ensis*.

This is the first time to produce triploid tropical shrimps by cold shock and 6-DMAP in this invention which not only increased the level of the triploid induction but also increased the triploid survival rate.

EXAMPLE 4

The Triploid Induction with Nontoxic Revulsant PC in Chinese Shrimp *F. chinensis*

The gravid Chinese shrimps were reared according to the methods in example 1 to make it spawn under the temperature of 15-16° C. At about 20 min after the spawning, surplus water was filtered with the sieve cloth to concentrate the fertilized eggs; the sieve cloth containing these fertilized eggs was immerged in seawater and ready for the next treatment. At about 34 min after the spawning, the sieve cloth together with the fertilized eggs were immerged in the revulsant 0.6%

(w/v) PC solution for 15 min before the release of the first polar body associated with the microscope observation. The treated fertilized eggs in the sieve cloth were transferred to a hatching tank for shrimp hatching. The ploidy of the treated batch was detected by flow cytometry with the highest inducing rate of 97%. Therefore, PC is an effective revulsant for the production of triploid shrimps. Compared to other traditional chemical revulsants such as CB and 6-DMAP, PC used in this invention is nontoxic, safe and convenient to be handled, could lead to higher inducing rate.

What is claimed is:

1. A triploid breeding method for obtaining triploids of cold-warm water shrimp or tropical shrimp which comprises
    (a) concentrating fertilized eggs from the cold-warm water shrimp after spawning at a temperature of 15-16° C., and
        (a1) subjecting the fertilized eggs to heat shock treatment by exposing the fertilized eggs to seawater having a temperature of 30-31° C. for a duration of 8-10 minutes, wherein the fertilized eggs were concentrated by allowing the fertilized eggs to settle and then removing a layer of seawater above the fertilized eggs, to obtain meiosis I (MI) triploids, or
        (a2) collecting the concentrated fertilized eggs with a sieve cloth, and subjecting to treatment with a revulsant 0.5-0.6% (w/v) PC solution at 30-34 minutes after spawning for a duration of 15-18 minutes;
    or (b) concentrating fertilized eggs from the tropical shrimp after spawning at 27-28° C., and
        (b1) subjecting the fertilized eggs to cold shock treatment by exposing the fertilized eggs to seawater having a temperature of 5-10° C. for a duration of 15-20 minutes, or
        (b2) treating the fertilized eggs with a seawater solution comprising 200-400 µM 6-DMAP for a duration of 10-12 minutes.

2. The method of claim 1, and further comprising detecting the ploidy of the treated fertilized eggs by flow cytometry.

3. The method of claim 1, wherein the cold-warm water shrimp is *Fenneropenaeus chinensis*.

4. The method of claim 1, wherein the tropical shrimp is *Penaeus merguiensis* or *Metapenaeus ensis*.

5. The method of claim 1, wherein the fertilized eggs of step (a2) are collected 10-15 minutes after spawning.

6. The method of claim 1, wherein the fertilized eggs are concentrated by allowing the fertilized eggs to settle and then removing an layer of seawater above the fertilized eggs.

7. The method of claim 1, wherein the heat shock treatment of step (a1) occurs 8-12 minutes after spawning.

8. The method of claim 1, wherein cold shock treatment of step (b1) occurs 10-15 minutes after spawning.

9. The method of claim 1, wherein meiosis I (MI) triploids of cold-warm water shrimp are obtained from step (a1).

10. The method of claim 1, wherein the fertilized eggs are collected in step (a2) at about 25-30 minutes after spawning.

11. A triploid breeding method for obtaining triploids of cold-warm water shrimp which comprises
    obtaining fertilized eggs from the cold-warm water shrimp, and
    treating the fertilized eggs with a revulsant 0.5-0.6% (w/v) PC solution at 30-34 minutes after spawning for a duration of 15-18 minutes.

12. A triploid breeding method for obtaining meiosis I (MI) triploids of cold-warm water shrimp which comprises
    concentrating fertilized eggs from the cold-warm water shrimp after spawning at a temperature of 15-16° C. by allowing the fertilized eggs to settle and then removing a layer of seawater above the fertilized eggs, and
    subjecting the fertilized eggs to heat shock treatment by exposing the fertilized eggs to seawater having a temperature of 30-31° C. for a duration of 8-10 minutes.

13. A triploid breeding method for obtaining triploids of tropical shrimp which comprises
    concentrating fertilized eggs from the tropical shrimp after spawning at 27-28° C., and
        (1) subjecting the fertilized eggs to cold shock treatment by exposing the fertilized eggs to seawater having a temperature of 5-10° C. for a duration of 15-20 minutes, or
        (2) treating the fertilized eggs with a seawater solution comprising 200-400 µM 6-DMAP for a duration of 10-12 minutes.

14. A triploid breeding method for obtaining triploids of tropical shrimp which comprises
    concentrating fertilized eggs from the tropical shrimp after spawning at 27-28° C., and
    treating the fertilized eggs with a seawater solution comprising 200-400 µM 6-DMAP for a duration of 10-12 minutes.

* * * * *